(12) United States Patent
Strickland et al.

(10) Patent No.: US 8,208,412 B2
(45) Date of Patent: Jun. 26, 2012

(54) METHOD AND SYSTEM FOR NETWORK ADDRESS TRANSLATION (NAT) TRAVERSAL OF REAL TIME PROTOCOL (RTP) MEDIA

(75) Inventors: David Peter Strickland, Carp (CA); Michel Moubarak, Chelsea (CA); Ronald Brett Buckingham, Kanata (CA); Ricardo Borba, Kanata (CA)

(73) Assignee: Broadview Networks, Inc., Newark, NJ (US)

(*) Notice: Subject to any disclaimer, the term of this patent is extended or adjusted under 35 U.S.C. 154(b) by 436 days.

(21) Appl. No.: 12/305,818

(22) PCT Filed: Dec. 28, 2007

(86) PCT No.: PCT/CA2007/002375
§ 371 (c)(1),
(2), (4) Date: Dec. 19, 2008

(87) PCT Pub. No.: WO2008/080225
PCT Pub. Date: Jul. 10, 2008

(65) Prior Publication Data
US 2009/0279537 A1    Nov. 12, 2009

Related U.S. Application Data

(60) Provisional application No. 60/882,691, filed on Dec. 29, 2006.

(51) Int. Cl.
*H04L 12/16* (2006.01)
(52) U.S. Cl. ........ 370/259; 370/401; 709/227; 709/238; 709/249

(58) Field of Classification Search .............. None
See application file for complete search history.

(56) References Cited

U.S. PATENT DOCUMENTS

| | | |
|---|---|---|
| 6,331,984 B1 | 12/2001 | Luciani |
| 6,490,289 B1 | 12/2002 | Zhang et al. |

(Continued)

FOREIGN PATENT DOCUMENTS

CN    1870689 A    11/2006

(Continued)

OTHER PUBLICATIONS http://www.cisco.com/univercd/cc/td/doc/product/core/cis7600/cfgnotes/sbc/sbc_abt.htm, Nov. 11, 2007.

(Continued)

*Primary Examiner* — Brian Roberts
(74) *Attorney, Agent, or Firm* — Curtis B. Behmann; Borden Ladner Gervais LLP

(57) ABSTRACT

A solution for the Network Address Translation (NAT) traversal problem for Real Time Protocol (RTP) is provided, which uses an RTP Proxy (e.g., a Session Border Controller (SBC)), instead of being logically located between the NAT and the Feature Server (FS), but instead, for devices which use a protocol unsupported by the SBC, having these devices first signal the Feature Server, which determines whether and how an RTP proxy should be invoked. An RTP proxy should be invoked by the FS if Both endpoints (e.g., devices) are behind different NATs (or one of the endpoints is behind a NAT and the other is not) and neither of the endpoints are already signaled through an RTP proxy. For example, the SBC is interposed (at least logically) between the Feature Server and other shared components.

22 Claims, 9 Drawing Sheets

U.S. PATENT DOCUMENTS

| | | |
|---|---|---|
| 7,006,436 B1 | 2/2006 | Chu et al. |
| 2002/0114322 A1* | 8/2002 | Xu et al. ............... 370/352 |
| 2005/0108411 A1* | 5/2005 | Kliland et al. ............ 709/230 |
| 2005/0125532 A1 | 6/2005 | Kimchi |
| 2005/0207431 A1* | 9/2005 | Monai .................. 370/401 |
| 2005/0210292 A1 | 9/2005 | Adams et al. |
| 2006/0203831 A1* | 9/2006 | Yoshizawa et al. ......... 370/401 |
| 2006/0274899 A1 | 12/2006 | Zhu et al. |
| 2007/0036151 A1* | 2/2007 | Baeder ................. 370/352 |
| 2007/0160058 A1 | 7/2007 | Zhou et al. |

FOREIGN PATENT DOCUMENTS

| | | |
|---|---|---|
| EP | 1613024 A1 | 1/2006 |
| EP | 1693998 A1 | 8/2006 |
| WO | 2006082576 A2 | 8/2006 |
| WO | 2007079643 A1 | 7/2007 |

OTHER PUBLICATIONS http://www.ingate.com/files/Solving_Firewall-NAT_Traversal.pdf, published at least as early as Nov. 5, 2007.

http://www.lightreading.com/documents.asp?doc_id=65509&print=true, Nov. 14, 2007.

http:/www.cisco.com/application/pdf/en/us/guest/products/ps6342/c1244/cdccont_0900aecd80391b66.pdf, published at least as early as Nov. 5, 2007.

NAT Traversal for Multimedia over IP Services, http://www.newport-networks.com/cust-docs/33-NAT-Traversal.pdf, 2006.

* cited by examiner

METHOD AND SYSTEM FOR NETWORK ADDRESS TRANSLATION (NAT) TRAVERSAL OF REAL TIME PROTOCOL (RTP) MEDIA

CROSS REFERENCE TO RELATED APPLICATIONS

This application claims the benefit of priority of U.S. Provisional Patent Application No. 60/882,691 filed Dec. 29, 2006, which is incorporated herein by reference.

FIELD OF THE INVENTION

The present invention relates generally to the traversal of Network Address Translation devices (NATs) for Real-Time Transport Protocol (RTP) media. More particularly, the present invention relates to doing so for Voice over IP (VoIP) networks.

BACKGROUND OF THE INVENTION

Traditional telephony solutions which were previously delivered by circuit switched telephony applications are increasingly being provided by Voice over Internet Protocol (VoIP) applications. Examples of circuit switched telephony applications include the Public Switched Telephone network (PSTN) for carriers and Private Branch Exchanges (PBXs), Key Systems and Centrex applications for enterprises.

The enterprise solutions typically provide 2 major advantages. First they allow an enterprise to provide telephone access for its members without requiring a separate outgoing line to the PSTN for each member. In other words, they allow a several members to share Network Access Resources (for example, external telephone lines). Second, they typically provide a larger set of features to its members.

As stated, VoIP is now being used to provide telephony. This is being implemented for several reasons. For example, consumers have found that VoIP calls are not subject to long distance telephone charges. Enterprises previously required separate voice and data networks, which can now be integrated. Furthermore, non traditional telephone operators can now provide telephony services to their subscribers using data networks (e.g., cable operators).

Accordingly, protocols for VoIP call set-up have been developed which typically require signaling between the endpoints of a call, and the endpoints are typically involved with each call set-up. Examples of such protocols are H.323, Session Initiation Protocol (SIP) and MGCP. As will be appreciated by a person skilled in the art, voice is typically carried using Real-Time Transport Protocol (RTP) over UDP/IP.

As described above, one of the advantages of PBXs and Key Systems is the ability to share Network Access Resources. This is also desirable for computers and other IP devices on a Local Area Network (LAN) which require communication with the Internet. Thus, for example, several computers connected on a LAN can share one or more access lines (e.g., DSL, cable or T1) for internet access. One of the key Network Access Resources are IP addresses. In order to transmit data between devices using IP, each IP device involved in a session needs a unique IP address. Network Address Translation devices (NATs) allow for the sharing of external IP addresses. Each device on the Private (enterprise or residential) side of a NAT is allocated an IP address. However, such an IP address is not in fact unique. Although it is not repeated within the LAN connected to the NAT, the same address can be allocated to many other devices by other NATs. The NAT itself is provided with one or more external IP addresses, which are unique. IP packets destined to a device behind a NAT are sent to the NAT's external IP address, which is then routed to the private IP address of the device.

However, introducing Network Address Translation devices (NATs) into an IP network complicates the establishment of voice streams carried within RTP. RTP is used to carry voice in a packetized form in an IP network. However unsolicited inbound RTP streams can not generally traverse a NAT. This is due to the fact that the signaling protocols used in conjunction with RTP refer to the private IP address of the RTP endpoint. This private IP address is typically unreachable by the other endpoint which is part of the conversation. This is called the media NAT traversal problem. One approach for solving this problem is to introduce another network element that is able to modify signaling messages to cause the devices behind a NAT to send an RTP stream to a known IP address, and use the source IP address from the packets received to send packets back to the actual intended destination or device. An example of such a network element used by Service Providers (hereafter "Carriers") for a number of protocols (SIP, MGCP and H.323) is a generic class of products called Session Border Controllers (SBCs), which are typically implemented at the customer border of the Carrier network. A discussion of this NAT traversal problem, and solutions, is included in a White Paper by Newport Networks, *NAT Traversal for Multimedia over IP Services*—2006, http://www.newport-networks.com/cust-docs/33-NAT-Travers-al.pdf, the contents of which are hereby incorporated by reference in their entirety. An SBC includes an RTP proxy. An RTP proxy is an entity which relays RTP streams between two endpoints. One application of an RTP proxy is NAT traversal where the RTP proxy learns the destination to which it should relay the RTP stream by identifying the source of the other side of the stream. A document which describes how an RTP proxy is used for NAT traversal is U.S. Pat. No. 7,006,436, the contents of which are also hereby incorporated by reference in their entirety.

While an SBC solution works for SBC-supported standard protocols (SIP, MGCP and H.323), such a solution has limits because SBCs do not support all phone device control protocols without major modifications. Thus an alternative needs to be found for supporting phone device control protocols for PBXs or Feature Servers (also known as Call Processing Servers), and the features and devices supported by these protocols, which often offer a broader and/or more customized set of features than are available via typical SBC supported protocols (which typically are limited to SIP, MGCP or H.323). In this specification, the term Feature Server (FS) includes suitably configured PBXs.

Furthermore, the nature of VoIP signaling protocols and the fact that RTP endpoint identifiers are not always captured at the same point in call establishment makes direct protocol conversion to a supported protocol limited even when possible. For example, converting between protocols will often result in only the features common between the two protocols surviving the conversion. Furthermore, direct conversion can only be implemented for a specific protocol, and sometimes different protocols are desired because they offer different features. Even in the case where protocol conversion is implemented there are features that are necessary to deliver a phone service that might not survive the conversion. As one example, when numbers are dialed by a device using some IP PBX stimulus protocols, the digits are sent one at a time and the application server is responsible for determining when the full number has been dialed. With a SIP phone, the user presses "OK" or "Send" at the end of the number and the whole number is sent in one message. Performing the "conversion" then requires the "converter" to be aware of dial plans, etc, which involved much more than protocol conversion and is often impractical.

Additional problems arise when only some of the phones are deployed behind NATs while others are not, as a solution that unnecessarily uses network resources should be avoided.

Additional complications and opportunities for optimization exist when a mixture of devices using proprietary protocols and SBC-supported standard protocols are used.

It is desired that the Feature Server retain knowledge of the network topology, specifically of the LAN at which the phones are located. This allows for the detection of calls between phones behind the same NAT as well as to allow the delivery of "site-specific" features.

It is, therefore, desirable to obviate or mitigate at least one disadvantage of previous solutions to the NAT traversal problem, while providing a full feature set to devices behind a NAT.

SUMMARY OF THE INVENTION

It is an object of the present invention to obviate or mitigate at least one disadvantage of previous solutions to the NAT traversal problem, while providing a full feature set to devices behind a NAT.

In a first aspect, the present invention provides a solution which comprises using an RTP Proxy (e.g., an SBC), instead of being logically located between the NAT and the Feature Server (FS), but instead, for devices which use a protocol unsupported by the SBC, having these devices first signal the Feature Server, which determines whether and how an RTP proxy should be invoked. For example, according to one embodiment, the SBC is interposed (at least logically) between the Feature Server and other shared components.

According to an aspect of the invention, the FS determines whether an RTP proxy (e.g., as included in an SBC) should be invoked if:

Both endpoints (e.g., devices) are behind different NATs or one of the endpoints is behind a NAT and the other is not; and neither of the endpoints are already signaled through an RTP proxy.

An aspect of the invention provides a network configuration comprising: (a) At least one NAT connected to a plurality of devices which communicate via RTP; and (b) At least one other device which communicates with said plurality of devices via RTP; and (c) A Feature Server configured to determine whether a session involving one of said plurality of devices and another device requires an RTP proxy for a media stream, and if so directs said media stream, between said device and said one other device via both said NAT and said RTP proxy. An embodiment according to this aspect provides that the FS determines whether a session requires an RTP proxy if said device is one of said plurality of devices which communicates with said FS via said NAT and if no other RTP proxy is involved in the session, and wherein said FS does not route said media stream through said RTP proxy if it determines such an RTP proxy is not required.

Another aspect of the invention provides a feature server (FS) for providing telephony features to VoIP phones associated with said FS and for controlling signaling between said associated VoIP phones and another device comprising: (a) A terminal interface for communication of signaling messages between said VoIP phones and said FS, said terminal interface being connectable to a plurality of VoIP phones wherein said VoIP phones can connect to said terminal interface directly or via a NAT; (b) An RTP Proxy interface for communication of signaling messages between said FS and an RTP proxy, said RTP proxy capable of media NAT traversal; (c) A call processing controller for evaluating and producing call processing signaling messages, said call processing controller configured to determine whether a session involving an VoIP phone requires an RTP proxy for a media stream, and if so, directs said media stream between said VoIP phone and said another device via both said NAT and said RTP proxy.

Another aspect of the invention provides a computer program product tangibly embodied in a computer readable medium storing instructions which, when executed by a processor of a feature server (FS), causes said processor to implement a method of establishing a Real-Time Transport Protocol (RTP) Session for a device associated with said FS, said instructions comprising: (a) Instructions for determining whether said device communicates with said FS via a NAT (Network Address Translation device); (b) Instructions for determining whether a session involving said device and another device requires an RTP proxy for a media stream, and if so, (c) Instructions for directing said media stream between said device and said another device via both said NAT and said RTP proxy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION OF PREFERRED EMBODIMENTS OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Figure 1:
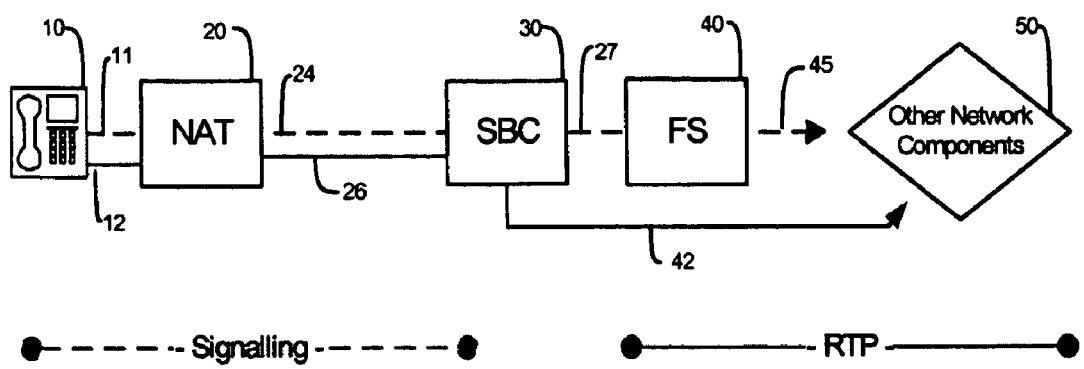
FIG. 1 is a block diagram illustrating a network configuration involving a Session Border Controller (SBC) for addressing the NAT traversal problem.

FIG. 1 is a block diagram illustrating a network configuration involving a Session Border Controller (SBC) 30 for addressing the NAT traversal problem as discussed above for a Carrier hosted feature server FS 40. In this configuration a VoIP telephone 10 is connected to a NAT 20 through a LAN (not shown) which provides both a signaling path 11 and a media path 12. In this implementation, the SBC is located at the customer border of the Carrier network (hence its name Session Border Controller). As the SBC 30 is located at the customer border of the Carrier Network, the SBC 30 is interposed between the feature server 40 and the NAT 20. The feature server 40 is interposed between the SBC 30 and Other Network Components 50 (for example a PSTN gateway from a signaling perspective and provides carrier hosted call processing and other features to devices within an enterprise or residence behind NAT 20.

In this figure, each block is connected via both a signaling and media path, with the exception of the feature server 40 which is connected via a signaling path. For example the NAT 20 communicates with the SBC 30 via signaling path 24 and media path 26, similarly signaling path 27 exists between the SBC 30 and the feature server 40, which in turn has a signaling path 45 to the other network components 50. Media path 42 exists directly between the SBC 30 and the other network component 50. The SBC 30 generally supports protocols such as MGCP, H323, and SIP. In cases where the telephone 10 communicates with the feature server 40 using one of these protocols, then this solution is adequate. However such an arrangement does not allow the telephone 10 and the feature server 40 to use different protocols such as some proprietary protocol, which may provide a broader range of features than the SBC supported protocols.

Figure 2:
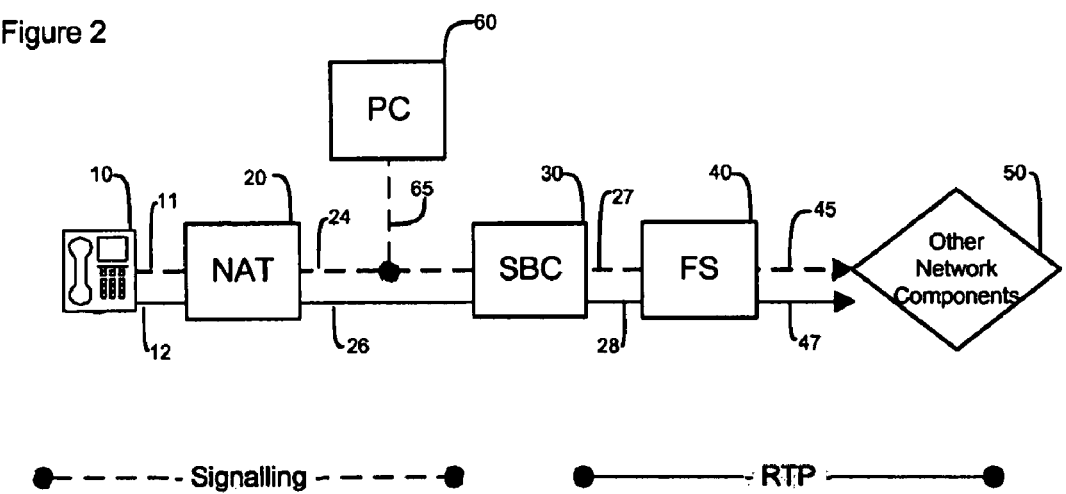
FIG. 2 is similar to FIG. 1, but adds a protocol converter.

FIG. 2 illustrates one simple solution for allowing such a telephone 10 to communicate using the SBC 30. In this example a protocol converter 60 is inserted within the signaling path 24 and converts the signaling protocol used by the telephone 10 into a standard protocol, for example SIP. While this approach allows telephone 10 and feature server 40 to traverse the NAT 20 using the functionality of the SBC 30, this is effectively done by eliminating the added features provided by the proprietary protocol. In other words, only the features common between the proprietary protocol and SIP are converted by the protocol converter 60. In addition, this prevents the feature server 40 from providing some features to the telephone 10. Furthermore, in the case of a FS/PBX which accepts individual dialed digits and then determines the destination phone number, such a protocol converter must do a lot more than protocol conversion, making such a solution not practical.

Figure 3:
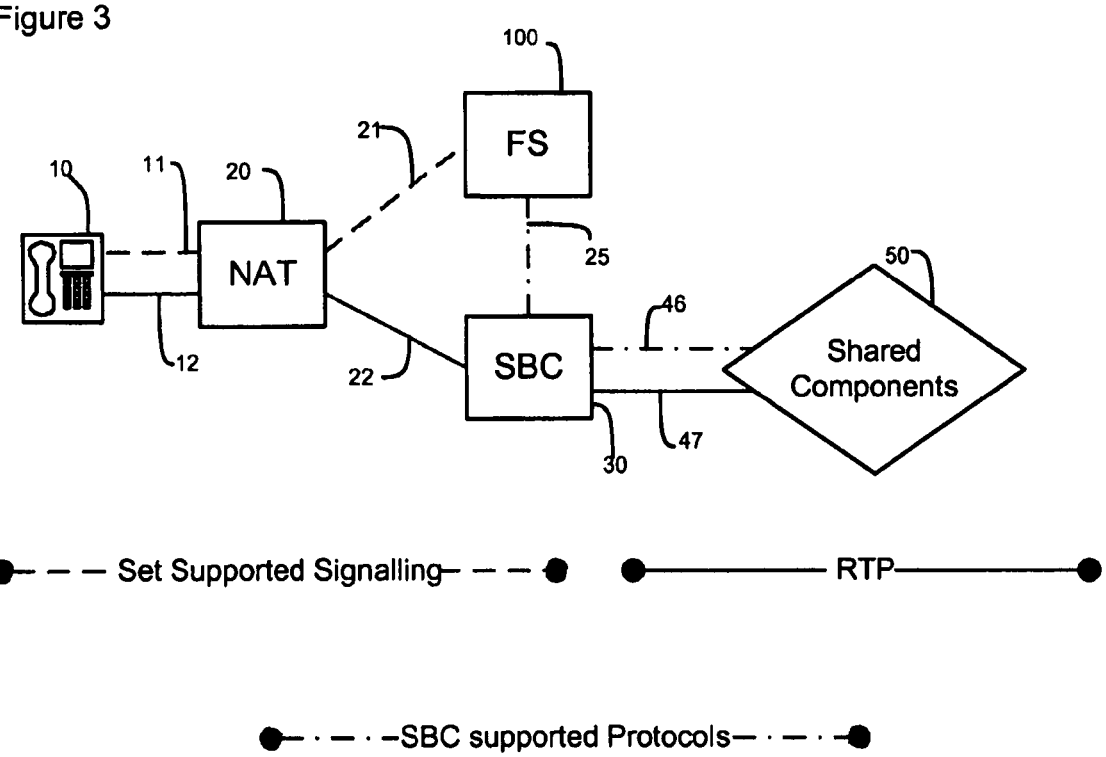
FIG. 3 illustrates an exemplary network figuration according to an embodiment of the invention.

FIG. 3 illustrates an exemplary network figuration according to an embodiment of the invention. In this figure, the VoIP telephone again communicates with the outside world via both a signaling channel 11 and media path 12 via a NAT 20. However, in this figure the signaling protocol and media paths diverge with the signaling channel 21 going to the feature server 100 while the media path links the NAT 20 with the SBC 30. It should be appreciated that both of these paths may be carried by a single physical link or by different physical links between the carrier and the enterprise. One thing to note is the bandwidth between the enterprise and carrier is typically limited, and thus it is desirable to conserve this bandwidth when possible. Another signaling link 25 links the feature server 100 with the SBC 30 which in turns communicates with signaling paths 46 to the Shared Network Components 50. The Shared Network Components 50 are a set of network-based resources or devices which provides a function that can be shared across one or more Feature Servers or tenants/customers/sites. Each shared component typically has a signaling interface to the feature server. This is often SIP, however, it could be a variety of different protocols including MGCP, H323 and proprietary protocols. Each shared component will provide an interface for both reception and transmission of RTP, and can be treated as an endpoint of an RTP session involving a phone 10. A shared component may optionally have an RTP proxy capability. Examples include IP to PSTN Gateways, Softswitches, Media Servers, Conference servers, and Voice Mail servers.

One difference between the embodiment shown in FIG. 3 and the configuration shown in FIG. 1 is that the SBC 30 (despite its name) is moved away from the customer border of the carrier network (at least logically, from a signaling perspective), and is now interposed between the feature server 100 and the shared components 50 rather then being located between the NAT 20 and the feature server 40 in FIG. 1. This is significant as it allows different protocols to be used in the different signaling messages. As can be seen, the signaling messages 11 and 21 support the set control protocols which may be a stimulus protocol, proprietary protocol or some other protocol which allows for a broader set of features to be supported by the feature server 100 then would be otherwise be possible using an SBC supported protocol. The feature server in turn communicates using such an SBC supported protocol with the SBC 30, which in turn communicates with the shared components in the conventional manner. Such a configuration allows for a conventional NAT 20 and conventional SBC 30 to be used while still providing for the full feature set supported by the set control protocol and feature server 100.

In this scenario, phone device control messages go through the NAT 20 to the feature server 100. All the interactions with shared components are using a protocol supported by the SBC 30. These messages are sent via the SBC 30, and the SBC 30 will modify the SDPs (session description protocol) such that the RTP steams 12, 22, and 47 for both the Phone 10 and the Other Shared Component 50 are sent to the SBC 30. The SDP is typically an advertisement by an endpoint of the IP address and port number at which it expects to receive an RTP voice stream (i.e., an instruction to send a voice stream to it at IP address w.x.y.z, port number v). According to embodiments of the invention, rather than having the RTP flow directly to the endpoint, the SDP is modified to have the RTP streams sent to the SBC 30, which accomplishes NAT traversal and forwards them to the real destination. For example, assume endpoint A (i.e, phone 10) offers A:P1 as its SDP to endpoint Z (i.e., one of the network components 50). The SBC 30 intercepts the message and modifies that SDP to offer its own address S:P2 as a destination to Z. Z then sends RTP to S:P2 (the SBC) which forwards it to A:P1. In the process, the SBC 30 has also learned the public address of Z so that it can forward the reverse stream (which it will receive from A) to it. In this manner, the SBC 30 uses the reverse mapping of the two RTP streams so that the RTP stream is able to continue to the other device.

According to an embodiment of the invention, an SBC configured for Peering with RTP flows directed through the SBC can be made to function in the manner described in the previous paragraph.

One method for accomplishing this is to configure an SBC with two "sides," for example a "private" and a "public" side, and to configure rules to associate signaling messages going to or through the SBC (on the "public" side) with a specific shared resource (e.g. on the "private" side). One example of a rule could be a rule based on IP addressing where a specific IP address (and/or port number) on the "public" side represents a shared component on the "private" side and the SBC is configured to route the modified signaling traffic to that shared component.

Such an embodiment employs a hosted telephony application (e.g., the FS 100), with phone devices using a proprietary protocol at customer sites, and Gateway, Softswitches, Media Servers, Voice Mail servers deployed in the core of the network using a standard SBC supported protocol such as MGCP, H323 and SIP. With this solution, calls from or to a phone device 10 that involve a Gateway or Media Server would function using the SBC arrangement described above. Additionally calls within a site also function as the feature server would communicate with the phones directly, passing the private address of one phone to the other phone without the involvement of the SBC. For phone calls between two different phone devices between two different NATs, the feature server can introduce the SBC into the call by looping the call back to itself. This provides for one component in the RTP flow that can be signaled by the feature server through an SBC. An example of this is depicted in FIG. 4.

Figure 4:
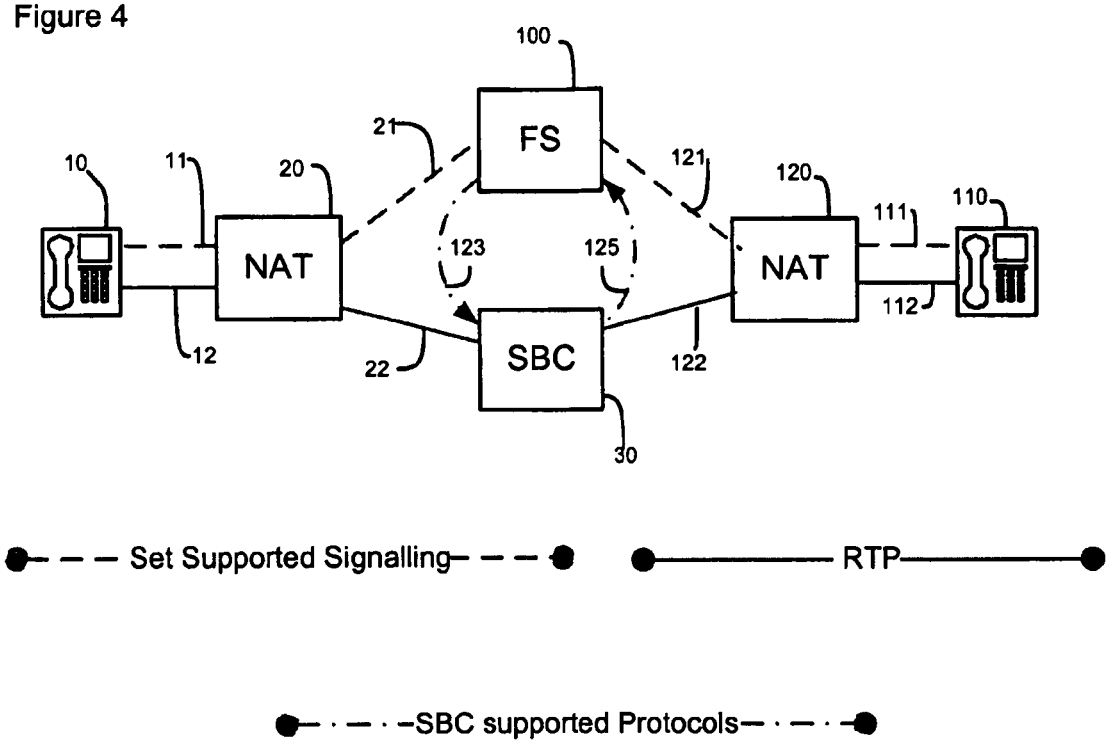
FIG. 4 depicts the configuration according to an embodiment of the invention which illustrates a call from two phones each behind a different NAT.
Figure 8:
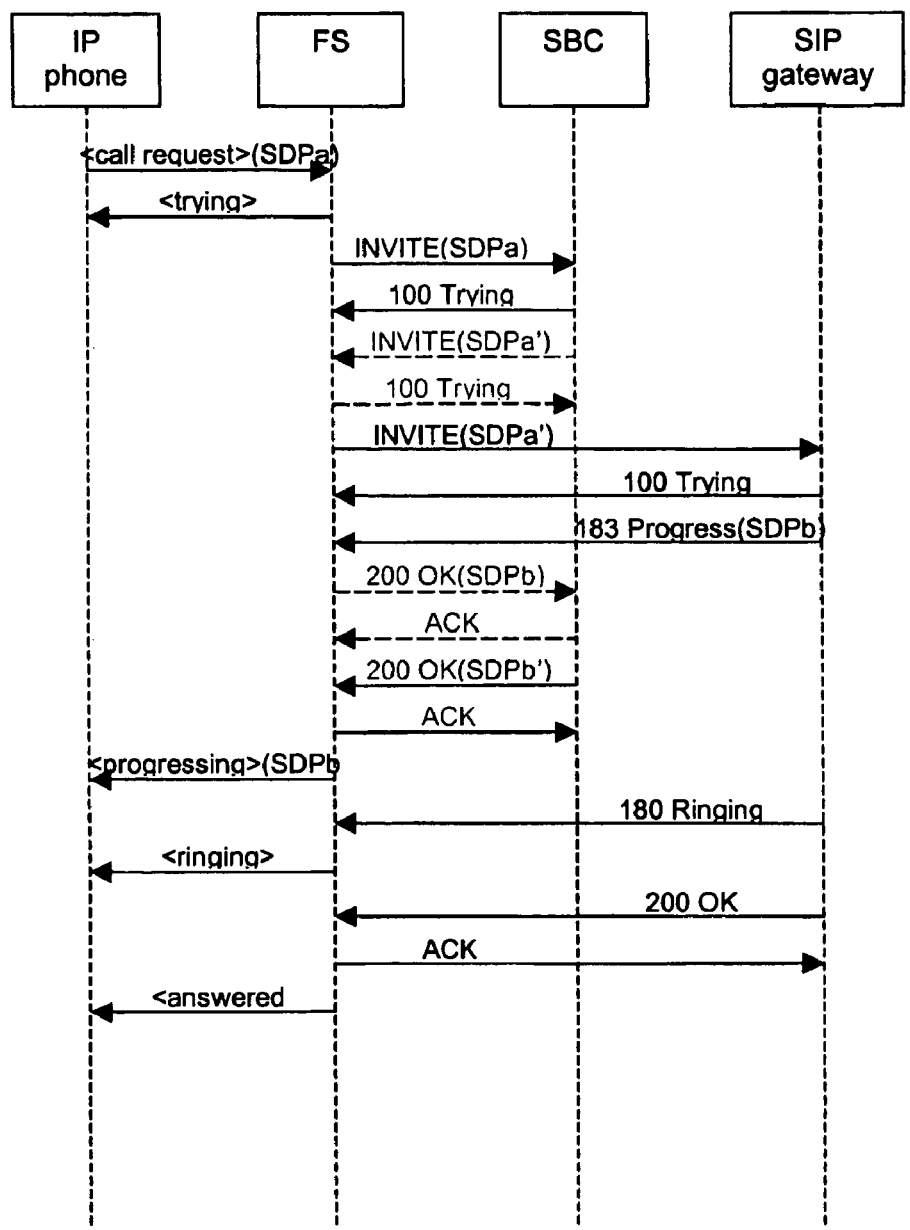
FIG. 8 is a signaling diagram illustrating signaling messages between different network elements according to an embodiment of the invention.

FIG. 4 depicts the configuration according to an embodiment of the invention which illustrates a call from two phones each behind a different NAT. Here the left half of the figure, including the phone 10, the NAT 20, the signaling path 11 and 21, and the RTP paths 12 and 22 are the same, as in FIG. 3. In this example, rather than the phone 10 involved in an RTP session with another network component, Phone 10 is involved in a VoIP call with phone 110 behind a different NAT 120. Phone 110 has a signaling path 111 through the NAT 120, which in turns signals the feature server via a signaling link 121. Similarly RTP is passed through media path 112, between the phone 110 and the NAT 120, and in turn between the NAT 120 and SBC 30 via RTP path 122. In this figure, two signaling paths 123 and 125 and a loop around arrangement provides signaling between the feature server 100 and the SBC 30. In this configuration, when the feature server 100 determines that the two end points are behind different NATs, call processing features of the FS treat the feature server 100 as another network component; effectively the feature server 100 calls itself via signaling paths 123 and 125 in order to learn RTP endpoint information from the SBC and thereby direct RTP streams through the SBC 30. An example of the signaling for this is shown in FIG. 8. Thus the Feature Server is able to invoke the SBC in a loop around manner to bring the SBC into the RTP path, while signaling directly to the end points involved. This allows an existing SBC to route RTP packets between devices which use a different protocol than that understood by the SBC. Thus an embodiment of the invention includes a network configuration wherein the FS signals the SBC using an SBC signaling protocol, and signals said devices using a device protocol (also called a set supported protocol). In this manner, the FS can correlate the two halves of the call, thus not loosing any functionality that would normally be lost when performing a protocol conversion between the set protocol and a protocol understood by the SBC.

Figure 5:
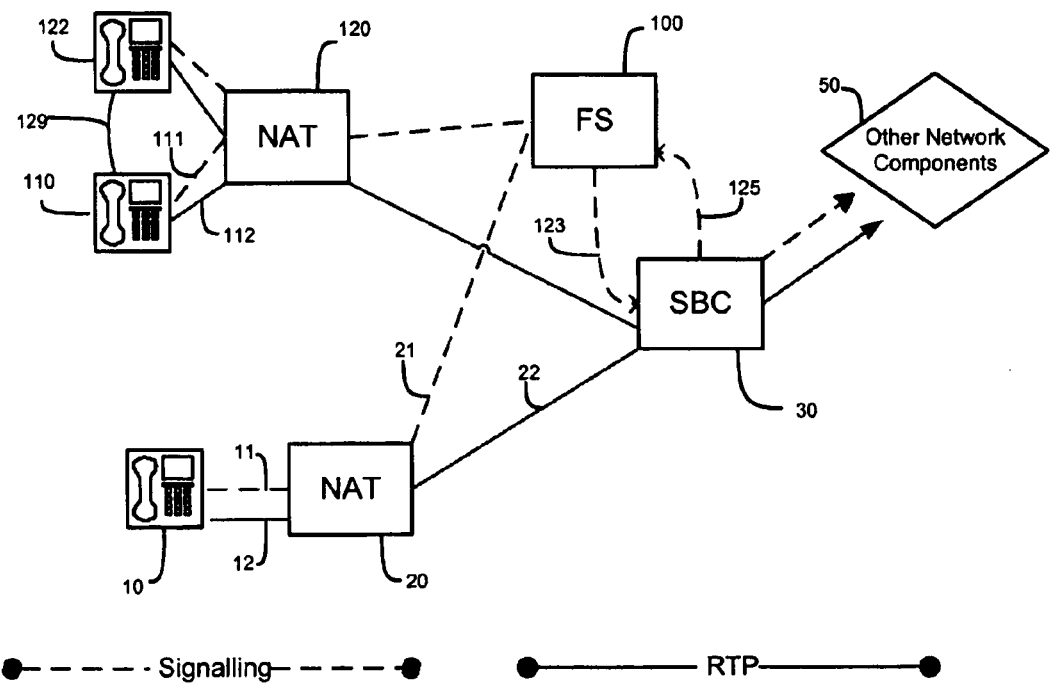
FIG. 5 is a block diagram illustrating several possible scenarios according to an embodiment of the invention.

FIG. 5 is a block diagram illustrating several possible scenarios according to an embodiment of the invention. In this example, NAT 120 is shown with connections to two different phones 122 and 110. At this point, we point out that for simplicity in the previous figures only one phone is shown although it should be understood that multiple phones are typically supported by a single NAT. However, in this figure, link 129 shows a phone call between phone 122 and 110; such a call does not require NAT traversal as both phones are on the same side of the NAT 120. Accordingly, the media steam 129 can pass directly between them. However, the signaling is still routed through the NAT 120 to the feature server 100. Similarly, a call from either of the phones 110 or 122 to phone 10 operates in significantly the same manner as illustrated in FIG. 4. Furthermore, a call between any single phone and one of the network components 50 operates in the same manner as illustrated in FIG. 3. Thus, the figure illustrates that the arrangement of the SBC interposed between the FS and the other network components allows for a wide variety of potential scenarios. A simple approach according to one embodiment of the invention is to automatically invoke the SBC via the loop around no matter which two end points are involved. However, this is not necessarily efficient, as it will use the SBC in scenarios where it is not required. This approach will also cause two devices behind the same NAT (which are able to send RTP to each other directly, without an SBC) to send RTP to the SBC. In the common case where the NAT is at the end of a restricted bandwidth pipe, this is an inefficient use of the bandwidth. Accordingly preferred embodiments allow for the SBC to be bypassed completely if not needed, thus conserving network resources. And, in particular, external bandwidth is not wasted as phones within the same site (for example 122 and 110) communicate without NAT traversal and therefore without requiring the RTP proxy function of the SBC.

Figure 6:
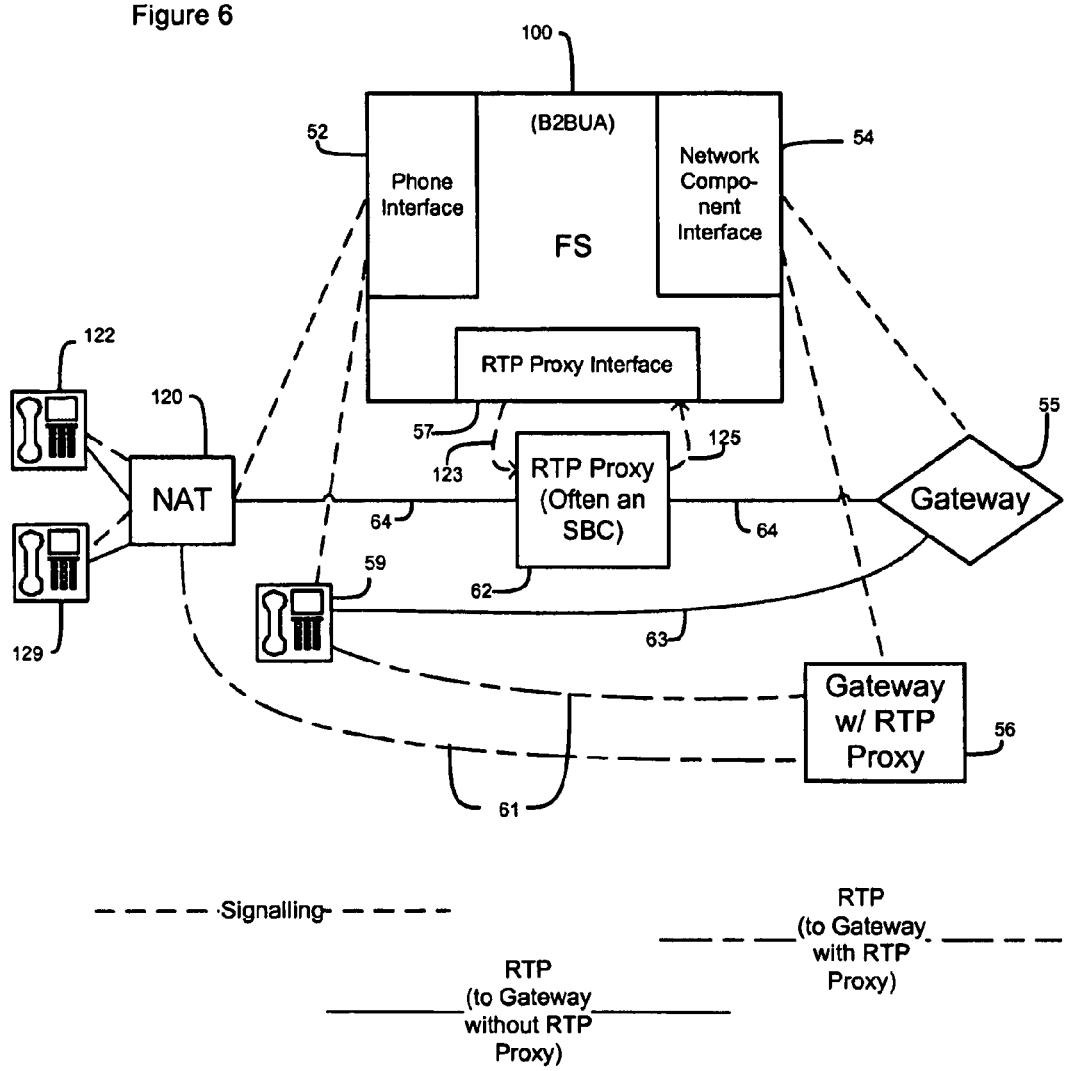
FIG. 6 illustrates another network configuration according to an embodiment of the invention.

FIG. 6 illustrates another network configuration according to an embodiment of the invention. FIG. 6 in addition illustrates in more detail some of the features of the FS 100. FIG. 6 illustrates that feature server 100 includes a phone interface 52 for connecting with phones either directly as shown for phone 59 or indirectly via NAT 120 for phones 122 and 129. It also shows an RTP proxy interface 57 for signaling an RTP proxy 62 (for example as part of an SBC). As illustrated and explained above, the signaling between the RTP proxy interface 57 and the RTP proxy 62 can take the form of loop back signaling 123 and 125. The FS 100 also includes a network component interface 54 for communicating with the shared network components, for example, gateways 55 and 56. This figure illustrates that the shared components can include their own RTP proxy function, as gateway 56 includes a RTP proxy whereas gateway 55 does not. One of the features of the feature server according to an embodiment of the invention is its ability to determine whether an RTP proxy, for example RTP proxy 62, needs to be invoked. This depends on whether NAT traversal is required and also whether an RTP proxy function has already been invoked within the RTP stream for a given session. So, for example, for a call between phones 59 and 129 an RTP function is required as the connection requires NAT traversal.

It should be noted that phone 59 is shown to have a signaling connection to the phone interface 52 of feature server 100 as well as an RTP path 63 to gateway 55 or an RTP path 61 to gateway 56. For example, if phone 59 and phone 129 belong to different enterprises with different numbering plans, phone 59 does not communicate directly to phone 129 via the FS, but its communications pass through a gateway. This is true even if phone 59 is an IP phone. While this is not mandatory, for security reasons it is advisable for an IP phone to connect through a gateway. In this particular example, gateway 55 does not include its own RTP proxy and therefore when a call is placed by phone 122 or 129 through the NAT 120 the FS 100 signals the RTP proxy 62 and routes the RTP stream 64 through the RTP proxy 62. However, in situations where gateway 56 is used, whether or not the phone uses a NAT, the media stream 61 is not routed through the RTP proxy 62, as gateway 50 includes its own RTP proxy and only one RTP proxy function is required. However, If the two phones were in the same enterprise numbering plan, they would typically talk "directly" (implying not through the gateway, although the RTP medial stream would still travel through the RTP proxy for NAT traversal).

One thing to note is that an SBC typically comprises both a media proxy (for example an RTP proxy) and a signaling proxy. In the conventional arrangements as shown in FIGS. 1 and 2 both are required. However, in the exemplary embodiment shown in FIG. 6 a network configuration is shown which only utilizes the RTP proxy, as the feature server can be configured to provide the signaling proxy functions within the signaling path. Accordingly, depending on the embodiment, an SBC may not be required, as long as an RTP proxy function is available.

Among other differences between the embodiments illustrated in FIGS. 3 and 6 is the difference between the configurations for use of an RTP proxy. In one case, signaling between the FS and the gateway is sent through the SBC which automatically inserts itself. In the second configuration, a loopback is used by the FS to explicitly involve the RTP proxy and the SBC is bypassed in the FS to gateway dialogue.

Figure 7:
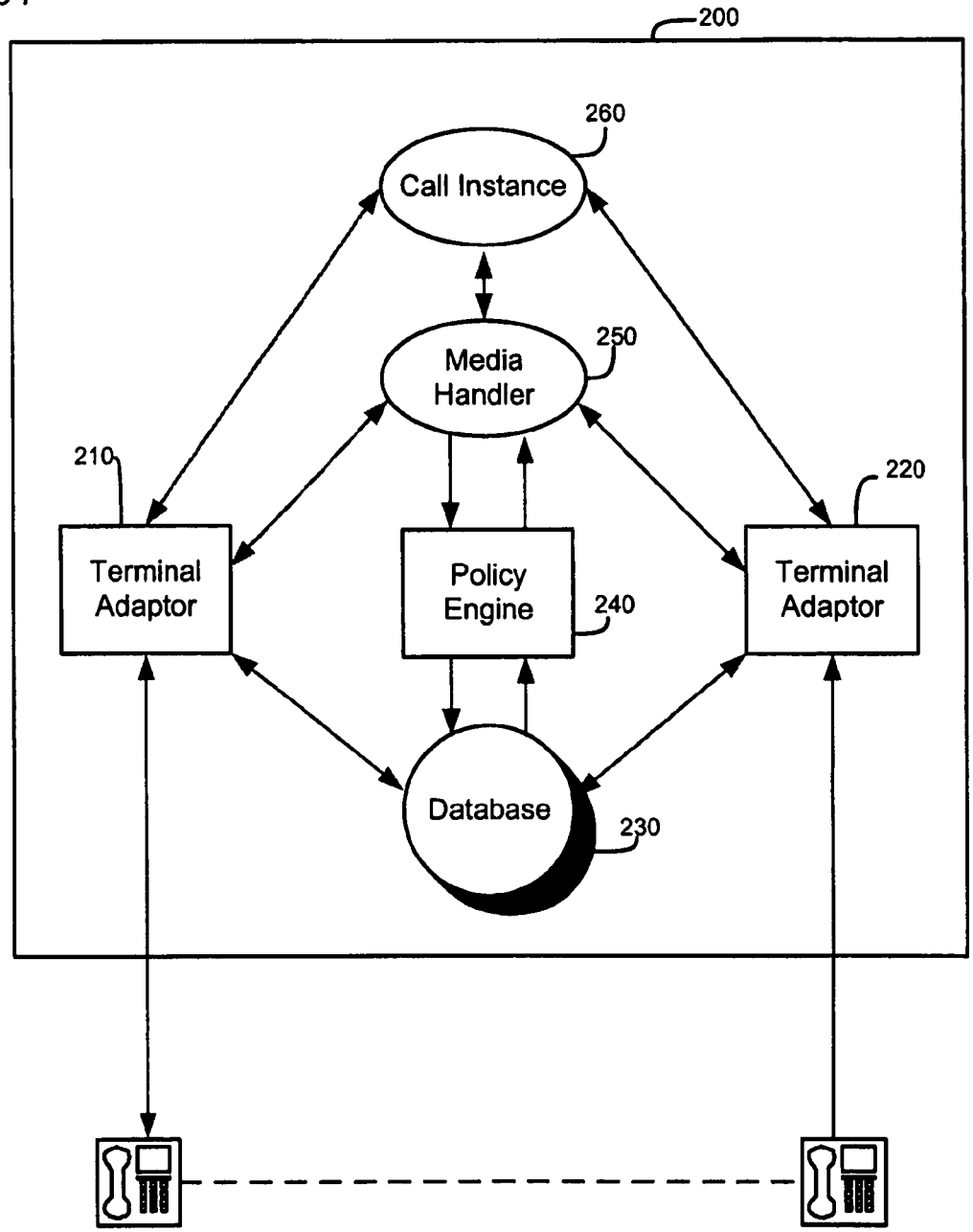
FIG. 7 is a block diagram illustrating software components of the call processing function of the feature server, according to an embodiment of the invention.

FIG. 7 is a block diagram illustrating software components of the call processing function of the feature server, according to an embodiment of the invention. This figure shows an example arrangement for a call between two telephones. However, it should be appreciated that a call between a phone and a network component would be equally applicable. The call processing engine includes a call instance module 260, a media handler 250, a policy engine 240, a database 230, and an instance of a terminal adaptor for each endpoint. In the figure, the terminal adaptor 210 (which forms part of the phone interface 52) communicates with a first phone of the call. The call instance module 260 manages the call, and is involved with receiving, evaluating and producing signaling required to establish the call between the two terminals. For example the call instance 260 converts from a proprietary protocol to SIP. The terminal adaptor 210 converts the protocol used to interface with the phone to an internal view of call handling. The media handler 250 manages the flow of media descriptors in the call. It controls the RTP proxy interface, as required, in order to insert an RTP proxy within a call. The policy engine 240 implements the logic to determine whether the phone is behind the NAT. The policy engine uses data in the database, as well as the information provided to the media handler by the terminal adaptors for determining whether an RTP proxy is involved in the call. Thus, the policy engine determines whether an RTP proxy needs to be inserted, and if so, directs the media handler to produce the signaling required by the RTP proxy interface for involving the RTP proxy.

As stated, in the example shown in FIG. 7, the call is processed between two terminals, and thus the figure shows two terminal adaptor instances 210 and 220, each part of the phone interface 52. However, a gateway or another network component can be an end point of the session, in which case the terminal adaptor 220 would be replaced by an instance of a network component adaptor as part of the network component interface. It should be appreciated that feature server 7 comprises a processor and computer readable memory storing computer executable instructions which when executed by said processor, implements the software components and methods described and claimed herein. As stated previously, the term feature server is intended to include IP PBXs, IP Centrex, IP Key systems as well as IP call servers.

FIG. 8 is a signaling diagram illustrating signaling messages between different network elements according to an embodiment of the invention. In this figure an example call set up is shown between an IP phone behind a NAT communicating with a SIP gateway via a feature server and SBC. In this example, the IP phone is considered endpoint "a" as it initiates the call to endpoint "b", the SIP gateway. Of course it should be appreciated that the SIP gateway is not the likely endpoint of the call, which is likely another phone on the other side of the gateway. However, the gateway is not changed and operates in the normal manner, so for ease of illustration we are treating it as the endpoint for the purposes of this example. The IP phone initiates a call by sending a call request message (SDPa) according to the set supported protocol. The FS processes the request and determines that the IP phone is behind a NAT and requires an RTP proxy. Accordingly, the FS does not directly signal the SIP gateway, but first sends an Invite (SDPa) to the SBC. This forms part of the loop back signaling discussed above, for example via signaling 123 in FIG. 6. The SBC will respond with an Invite (SDPa'), for example via signaling 125 in FIG. 6, shown as a dotted arrow in FIG. 8. The FS uses the information received from the SBC to signal the SIP gateway with Invite SDPa', which instructs the SIP gateway to send the RTP stream to via the SBC. The SIP gateway will send a Progress message back SDPb to the FS. Appropriate SIP signaling is passed between the FS and SBC as illustrated to establish an SDPb', and the FS sends an appropriate <progressing> message back to the IP phone (SDPb'). Accordingly, the call is effectively bridged by the FS-SBC loop back signaling, with the SDPa being translated to SDPa' in the phone to gateway direction and the SDPb being translated into SDPb' in the gateway to phone direction.

Figure 9:
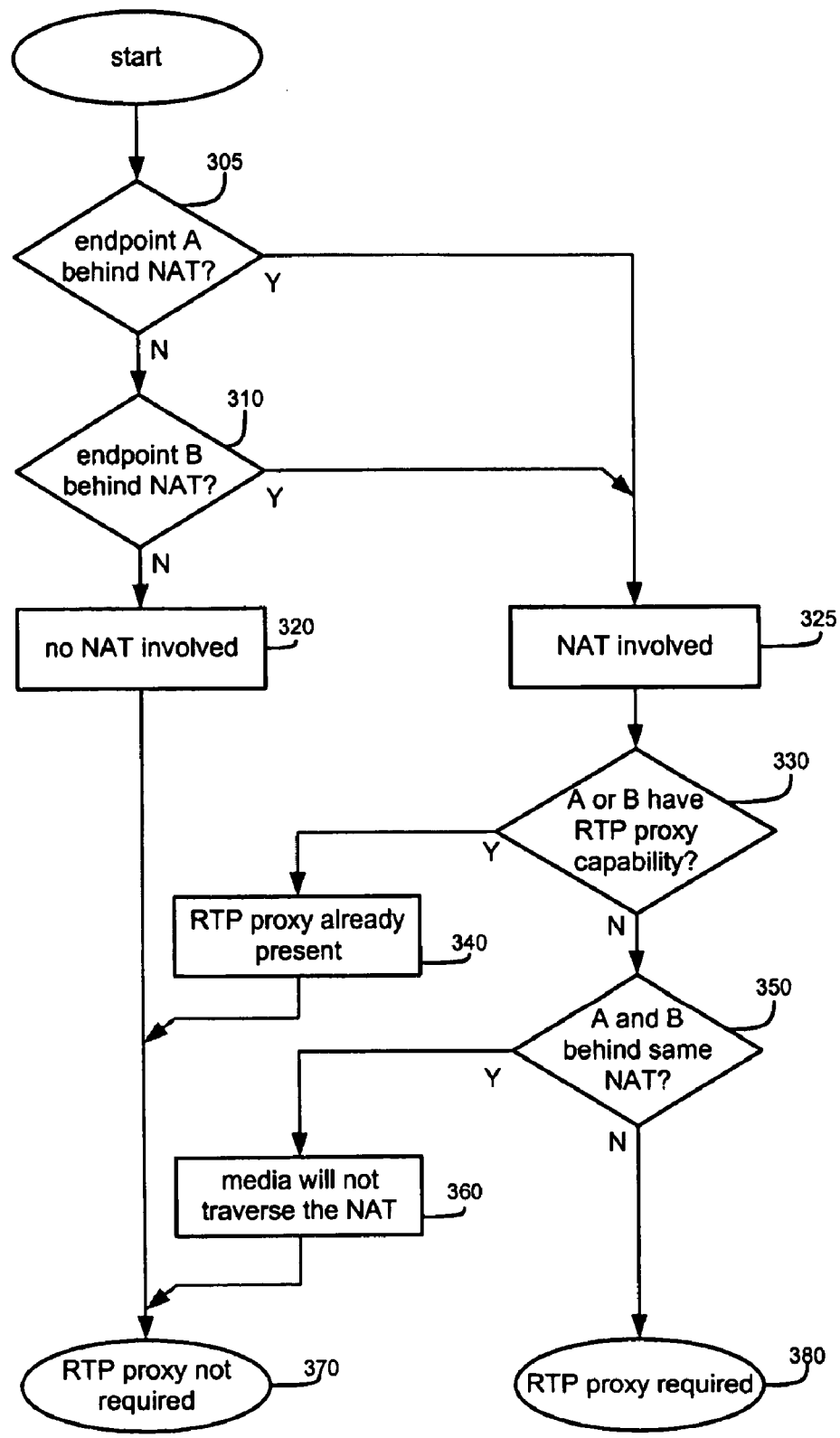
FIG. 9 is a flow chart illustrating a method implemented by a processor of the feature server according to an exemplary embodiment of the invention.

FIG. 9 is a flow chart illustrating a method implemented by a processor of the feature server for determining whether a session involving a device requires an RTP proxy for a media stream, and, if so, it directs the media stream via both the NAT and an RTP proxy according to an exemplary embodiment of the invention. First, the feature server determines whether one of the devices communicates with the feature server via a NAT as shown in 305 and 310. Note that for calls between a phone and a shared component, step 310 is unlikely to be necessary as the shared component will not be typically be behind a NAT. In any event, if the feature server determines that no NAT is involved 320, then it determines an RTP proxy is not required 370. If the feature server determines that a NAT is involved 325, it then determines whether another RTP proxy is already invoked in the session. For example, in step 330 the feature server determines whether either end-point has an RTP proxy capability. For example, if the end point is a gateway which includes an RTP proxy then it would determine that an RTP proxy is already present at 340, and conclude that an RTP proxy is not required 370. Assuming neither of the end points has an RTP proxy capability the feature server then determines whether they are both behind the same NAT 350. If both end points are behind the same NAT then there is no need for the media (for example the RTP) to traverse the NAT 360 and thus an RTP proxy is not required. Assuming both end points are not behind the same NAT then the feature server determines that an RTP proxy is required 380 and routes a media stream through an RTP proxy using the RTP proxy interface.

According to one embodiment, the FS determines whether one of the devices communicates with the feature server via a NAT by a topology database lookup. In this embodiment database 230 will store topology information including information as to which devices communicate with the FS via said NAT. As an alternative, the FS determines if the device communicates with the FS via said NAT by evaluating the signaling packets to determine whether the address of the packets received corresponds with the address from which the packets indicate they originate. According to an embodiment of the invention, the FS determines whether a device is behind a NAT by comparing the source IP address of the signaling message that reaches the FS with the IP address the device reports as its IP address. If these two IP addresses are different, the device is determined to be behind a NAT. If these two addresses are the same, then the device is not behind a NAT. To determine whether a device is already signaled through an SBC, this information can be provisioned within the FS or PBX.

To provide secure deployment, the Feature Server can be deployed behind a firewall with specific signaling ports, forwarded to the Feature Server.

To maximize availability of the service in the case of component failure, multiple SBCs can be managed as a resource pool with the Feature Server only sending traffic to an available SBC.

Multiple instances of the Feature Server can also be provided to maximize the availability of the service offered. One version of this could be implemented with the phone devices connecting to two Feature Servers, and thus still being able to operate even if one of the Feature Servers fails.

In the case were there is a mixture of devices with some signaling with an SBC supported protocol, and there are others signaling with a non-supported protocol, two exemplary approaches are discussed below, according to embodiments of the invention. The devices using an SBC-supported protocol can register directly with the application server or can register through the SBC.

In some cases, it is advantageous to have all devices signal the Feature Server directly, and not signal via the SBC. In this case the Feature Server is aware of the fact that all these devices are behind the same NAT, so is able to efficiently route RTP without using valuable bandwidth. The Feature Server also deals with all devices in a uniform way which can simplify implementation.

Figure 10:
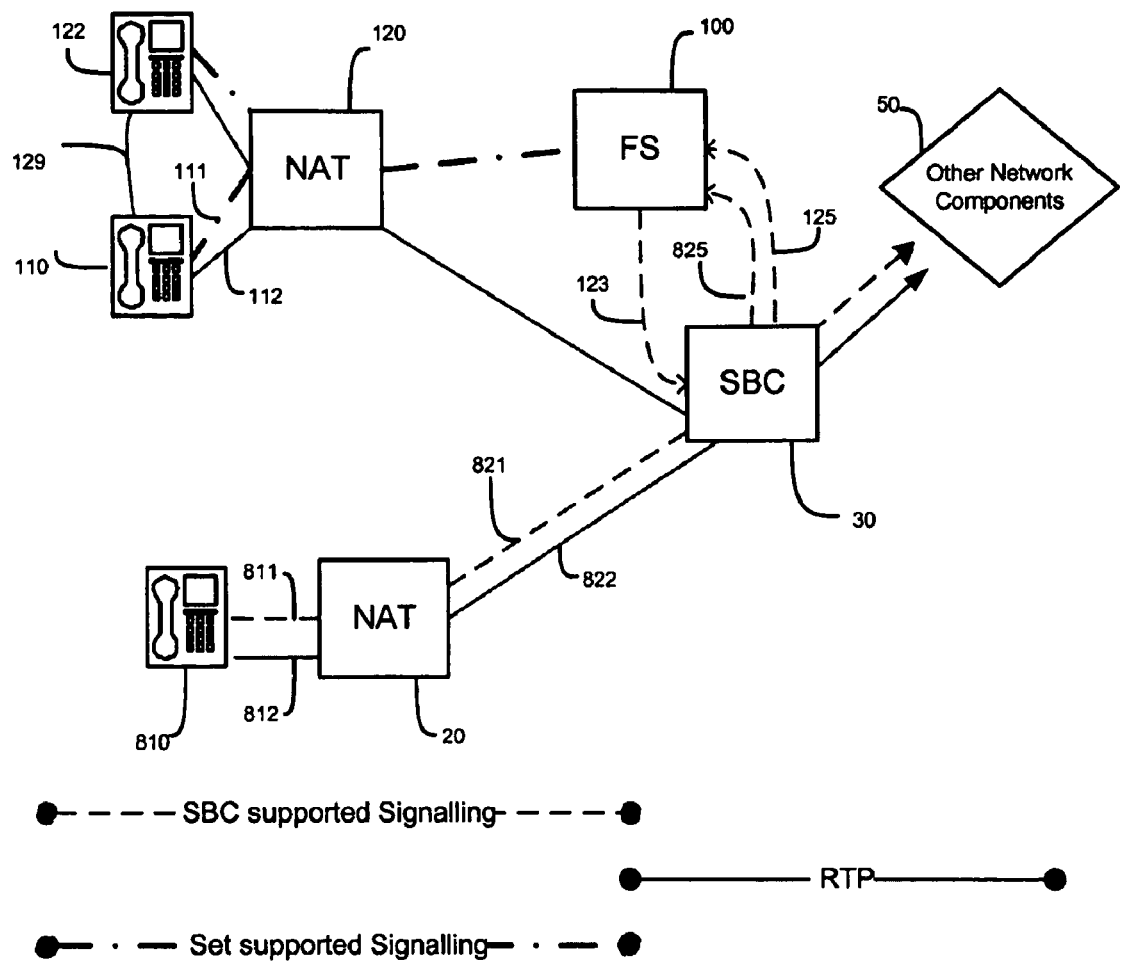
FIG. 10 illustrates another configuration, according to an exemplary embodiment of the invention.

In other cases, it may be preferred to have the devices using the SBC-supported protocol register through the SBC. This allows those devices to benefit from the enhanced security offered by the SBC and to offload the Feature Server from additional call processing duties. FIG. 10 illustrates such a configuration, according to an exemplary embodiment of the invention. FIG. 10 is similar to FIG. 5, except in this example, although Devices 122 and 120 continue to use a Set Supported Protocol (which is not supported by the SBC), device 810 uses a SBC-supported protocol, and thus both the signaling 811, 821 and RTP 812, 822 are sent directly to the SBC 30. In this case, the SBC signals 825 the FS 100 to initiate the call.

In this configuration, it is necessary to ensure that the information on topology and the presence of NAT be communicated to the Feature Server. According to an embodiment of the invention with such a configuration, the Feature Server determines:

1. Site location (for topology and site-specific feature delivery)
2. Presence of an RTP proxy which indicates that the device is signaled through an SBC and therefore that another SBC does not have to be explicitly invoked for calls involving this device.
3. Contact information so the Feature Server can determine where to direct new calls destined for the user associated with this device (i.e. to an address on the SBC rather than to the device directly).

In the case of SIP, this can be accomplished in the following way (similar approaches could be easily developed for other protocols):

The SBC is configured to handle the SIP devices in proxy mode rather than SBC mode Site information (topology) is extracted from the innermost via header of a REGISTER message. The terminal IP address and port is extracted from the "received/rport" parameters if they are present in the via header, or directly from the via address otherwise.

The SIP device is identified as requiring explicit NAT traversal only if the outermost via header contains a "received" parameter, otherwise the SIP terminal can be assumed to either not be behind a NAT or to have already been proxied by an SBC which will handle NAT traversal.

The device contact address (i.e., the signaling address to where the Feature Server sends INVITEs for the user associated with this device) must be extracted from the outermost via header (from the received/rport parameters if present or from the via address itself otherwise).

However, it should be appreciated that the scenario illustrated in FIG. 10 is but one example. It is possible that 2 different devices between the same NAT can use different protocols. For example device 122 can use an SBC supported protocol whereas device 110 uses a non-SBC supported protocol. In this case, device 110 signals the FS as described above with respect to the discussion relating to FIGS. 3-9. However, depending on the implementation, device 122 can use either approach (i.e., the same signaling configuration as used by device 110, or it can be configured to in the same manner as device 810 as described above).

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A network configuration comprising:
   a. at least one Network Address Translation device (NAT) connected to a plurality of devices which communicate via Real-Time Transport Protocol (RTP); and
   b. at least one other device which communicates with said plurality of devices via RTP;
   c. a Feature Server (FS) configured to determine whether a session involving one of said plurality of devices and said at least one other device requires an RTP proxy for a media stream, and if so directs said media stream, between said one of said plurality of devices and said at least one other device via both said NAT and said RTP proxy, and d. a Session Border Controller (SBC) interposed between said FS and said at least one other device, said SBC including said RTP proxy, wherein said FS determines whether a session requires an RTP proxy if said one of said plurality of devices communicates with said FS via said NAT and if no other RTP proxy is involved in the session, and wherein said FS does not route said media stream through said RTP proxy if it determines such an RTP proxy is not required, wherein said FS is configured to invoke said SBC using signaling configured in a loop around arrangement to bring the SBC into an RTP path, while signaling directly to said at least one other device and said one of said plurality of devices involved, and wherein said FS signals said SBC using an SBC signaling protocol, and signals said at least one other device and said one of said plurality of devices using a device protocol not supported by the SBC.

2. A network configuration as claimed in claim 1 wherein said FS further comprises a database of topology information including information as to which devices communicate with said FS via said NAT.

3. A network configuration as claimed in claim 1 wherein said FS determines if said one of said plurality of devices communicates with said FS via said NAT by evaluating signaling packets to determine whether an IP address of the signaling packets received corresponds with the IP address from which the signaling packets indicate they originate.

4. A network configuration as claimed in claim 1 such that signaling sent to the SBC from said one of said plurality of devices is sent to the FS via said signaling in a loop around arrangement.

5. A network configuration as claimed in claim 4 wherein said FS further comprises a media handler for communicating with an RTP proxy of said SBC.

6. A network configuration as claimed in claim 5 wherein said FS includes a module which implements said RTP proxy interface communication.

7. A network configuration as claimed in claim 1 wherein said at least one other device comprises at least one shared component.

8. A network configuration as claimed in claim 1 wherein the media stream traverses said one of said plurality of devices and said at least one other device via both said NAT and said RTP proxy in sequence.

9. A network configuration as claimed in claim 1
a. wherein said a plurality of devices which communicate via RTP comprises:
 i. a first device which communicates via an SBC supported protocol; and
 ii. a second device which communicates via a device protocol not supported by said SBC, wherein said second device comprises at least one shared component; and
b. wherein said network configuration is logically configured such that:
 i. said SBC is interposed between said NAT and FS for said first device; and
 ii. said SBC is interposed between said FS and said at least one shared component for said second device.

10. A network configuration as claimed in claim 9 wherein said FS is configured to use topology information to identify a site associated with said first device and to determine what contact address to use to direct new invites to said first device.

11. A network configuration as claimed in claim 10 wherein said SBC supported protocol is Session Initiation Protocol (SIP), and said FS is configured to extract said information from the header of a REGISTER message received from said first device via said SBC.

12. A Feature Server (FS) for providing telephony features to Voice over Internet Protocol (VoIP) phones associated with said FS and for controlling signaling between said associated VoIP phones and at least one other device comprising:

a. a terminal adaptor configured to communicate signaling messages between said associated VoIP phones and said FS, said terminal adaptor being connectable to a plurality of VoIP phones wherein said plurality of VoIP phones can connect to said terminal adaptor directly or via a Network Address Translation device (NAT);

b. a media handler configured to communicate signaling messages between said FS and an RTP proxy, said RTP proxy capable of media NAT traversal; and c. a call processing controller for evaluating and producing call processing signaling messages, said call processing controller configured to determine whether a session involving VoIP phone requires a Real-Time Transport Protocol (RTP) proxy for a media stream, and if so, directs said media stream between said VoIP phone and said at least one other device via both said NAT and said RTP proxy, d. a database of topology information including information as to which devices communicate with said FS via said NAT, wherein said call processing controller comprises a processor and memory, and wherein said memory stores computer readable instructions which when executed by said processor, cause said call processing controller to determine a session requires an RTP proxy if said VoIP phone communicates with said FS via said NAT and if no other RTP proxy is involved in the session, and wherein said RTP proxy forms part of a Session Border Controller (SBC) and signals said SBC using an SBC signaling protocol, and signals said VoIP phone using a phone protocol not supported by the SBC.

13. A FS as claimed in claim 12 wherein said at least one other device comprises a network component which communicates with said VoIP phone via an RTP media path.

14. A FS as claimed in claim 13 wherein said network component is selected from a group of shared components comprising a gateway, a media server, a voice mail server, a Softswitch or a Conference server.

15. A FS as claimed in claim 13 wherein said FS further comprises a network component adaptor for communicating signaling messages with said network component.

16. A FS as claimed in claim 15 wherein said SBC is interposed between said FS and said network component.

17. A FS as claimed in claim 12 wherein said at least one other device comprises another VoIP phone.

18. A FS as claimed in claim 12 wherein said FS is configured to bypass said RTP proxy with said media stream if it determines such an RTP proxy is not required.

19. A FS as claimed in claim 12 wherein said call processing controller determines if said VoIP phone communicates with said FS via said NAT by evaluating signaling packets to determine whether an IP address of the signaling packets received corresponds with the IP address from which the signaling packets indicate they originate.

20. A FS as claimed in claim 12 wherein said FS is configured to invoke the RTP proxy using signaling configured in a loop around arrangement to bring the RTP proxy into an RTP path, while signaling directly to said associated VoIP phones and said at least one other device involved.

21. A FS as claimed in claim 20 configured to send signaling from one of said at least one other device to the RTP proxy, wherein the signaling is sent to the FS via said signaling in a loop around arrangement.

22. A computer program product tangibly embodied in a non-transitory computer readable medium, storing instructions which when executed by a processor of a Feature Server (FS) causes said processor to implement a method of establishing a Real-Time Transport Protocol (RTP) Session for a device associated with said FS, said instructions comprising:
  a. instructions for determining whether said device communicates with said FS via a Network Address Translation device (NAT);
  b. instructions for determining whether a session involving said device and at least one other device requires an RTP proxy for a media stream, and if so,
  c. instructions for directing said media stream between said device and said at least one other device via both said NAT and said RTP proxy, wherein said instructions in (b) determine if said device requires an RTP proxy if:

i. said device communicates with said FS via said NAT;

ii. no other RTP proxy is involved in the session; and iii. said at least one other device is not located behind the same NAT as said device, wherein said RTP proxy forms part of a Session Border Controller (SBC) and wherein said instructions in (b) determines if said device requires an RTP proxy if said device communicates with a protocol not supported by said SBC.

* * * * *